(12) United States Patent
Lao et al.

(10) Patent No.: US 12,386,861 B2
(45) Date of Patent: Aug. 12, 2025

(54) METHOD AND SYSTEM FOR EFFICIENT DATA MANAGEMENT IN DISTRIBUTED DATABASE SYSTEM

(71) Applicant: HUAWEI TECHNOLOGIES CO., LTD., Shenzhen (CN)

(72) Inventors: Hoi Ieng Lao, Markham (CA); Ronen Grosman, Markham (CA); Yuk Kuen Chan, Markham (CA); Chung Yin Alan Wong, Toronto (CA); Dmitri Abrashkevich, Richmond Hill (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 25 days.

(21) Appl. No.: 17/902,335

(22) Filed: Sep. 2, 2022

(65) Prior Publication Data

US 2024/0078252 A1    Mar. 7, 2024

(51) Int. Cl.
*G06F 16/24* (2019.01)
*G06F 16/21* (2019.01)
*G06F 16/22* (2019.01)
*G06F 16/2453* (2019.01)
*G06F 16/28* (2019.01)

(52) U.S. Cl.
CPC .......... *G06F 16/285* (2019.01); *G06F 16/211* (2019.01); *G06F 16/2282* (2019.01); *G06F 16/24542* (2019.01)

(58) Field of Classification Search
CPC ............... G06F 16/285; G06F 16/2282; G06F 16/24542
See application file for complete search history.

(56) References Cited

U.S. PATENT DOCUMENTS 11,120,052 B1 * 9/2021 Ozen ................... G06F 16/9014
11,341,104 B1 * 5/2022 Prabhakaran ....... H04L 67/1097

OTHER PUBLICATIONS

About Schemas https://cloud.google.com/spanner/docs/schema-and-data-model.
Bussler and Jain, 2021 Cloud Spanner's Table Interleaving: A Query Optimization Feature (Published in Google Cloud Community https://medium.com/google-cloud/cloud-spanners-table-interleaving-a-query-optimization-feature b8a87059da16).
TPC Benchmark Standard Specification Revisions 5.11, Feb. 2010, Transaction Processing Performance Council (TPC).

(Continued)

*Primary Examiner* — Loc Tran

(57) ABSTRACT

The present disclosure provides methods, systems and apparatus for efficient data management in distributed database system. According to an aspect, a method is provided. The method includes relocating a first table and a second table of a database to a first node of the database, wherein the first table and a second table (or one or more tables which have a colocation relationship with the first table) are associated with one or more distribution keys corresponding to one or more columns of the first table and the second table. The method further includes defining a colocation relationship between the first table and the second table based on a distribution key of the one or more distribution keys. The colocation relationship may indicate that data of the first table and the second table that correspond according to the distribution key are to reside on a same node of the database.

20 Claims, 12 Drawing Sheets

(56) References Cited

OTHER PUBLICATIONS

Christoph Bussler et al, Cloud Spanner"s Table Interleaving: A Query Optimization Feature, URL:https://medium.com/google-cloud/cloud-spanners-table-interleaving-a-query-optimization-feature-b8a87059da16, Apr. 16, 2021, 18 pages.
Schemas overview, URL:https://cloud.google.com/spanner/docs/schema-and-data-model, 2019, 15 pages.
TPC Benchmark C, Standard Specification Revision 5.11, Feb. 2010, URL https://www.tpc.org/tpc_documents_current_versions/pdf/tpc-c_v5.11.0.pdf, 132 pages.

* cited by examiner

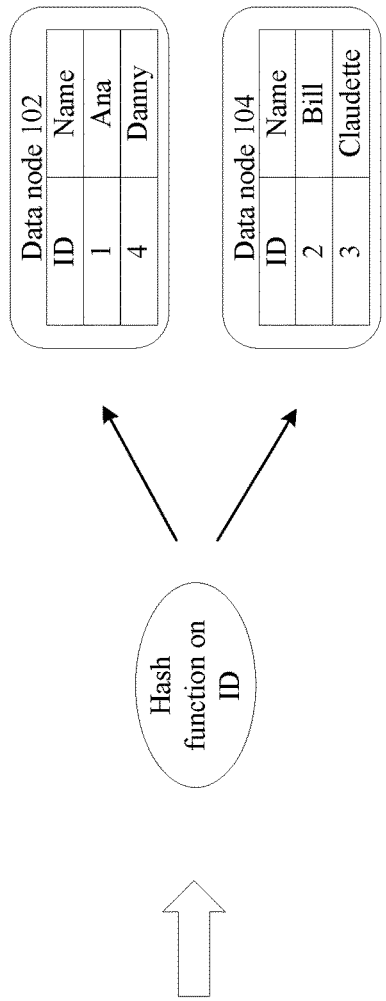
FIG. 1A
FIG. 1B

900

902. Relocating a first table and a second table of a database to a first node of the database, wherein the first table and a second table are associated with one or more distribution keys corresponding to one or more columns of the first table and the second table.

904. Defining a colocation relationship between the first table and the second table based on a distribution key of the one or more distribution keys.

906. Receiving a request to move a set of data of the first table from the first node to a second node of the database.

908. Determining, based on the colocation relationship and the first set of data, a second set of data of the second table corresponding to the first set of the data of the first table.

910. Moving the first set of data and the second set of data from the first node to the second node.

1102. Receiving a request to move data of a first table from a first node of a database to a second node of the database.

1104. Determining one or more other tables having a colocation relationship with the first table based on a mutual column.

1106. Determining one or more partition boundaries based on the data and the one or more other tables.

1108. Generating, based on the one or more partition boundaries, a set of partitions associated with one or more of: the first table and the one or more other tables.

1110. Moving one or more partitions from the set of partitions from the first node to the second node.

FIG. 11

METHOD AND SYSTEM FOR EFFICIENT DATA MANAGEMENT IN DISTRIBUTED DATABASE SYSTEM

CROSS-REFERENCE TO RELATED APPLICATIONS

This is the first application filed for the present invention.

FIELD

The present disclosure pertains to the field of database management, and in particular to methods and systems for efficient data management in a distributed database system.

BACKGROUND

In a shared-nothing architecture, data may be spread across multiple data nodes (DNs) of a database. Such a spread of data may require data from multiple DNs, when responding to, for example, a structured query language (SQL) query. Requiring data from multiple DNs may lead to increased contentions among DNs, reduced throughput, and frequent transaction aborts.

While some technologies exist to ameliorate database performance, such technologies have limitations. For example, the use of distribution keys has been helpful when a search key is the same as the distribution column. However, as partitions are moved across DNs, access to multiple DNs may be needed to respond to queries. Other existing techniques include the use of a load balancer and interleaved tables (Cloud Spanner™). Use of a load balancer is a reactive approach which may require time to study workload behaviour and further lead to reduced throughput. Use of interleaved tables may have a size restriction which can limit performance. Further, use of interleaved tables may lead to increased overhead when dealing with complex queries.

Therefore, there is a need for methods and systems for efficient data management in a distributed database system that obviate or mitigate one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

The present disclosure provides methods, systems and apparatus for efficient data management in distributed database system. According to a first aspect, a method is provided. The method includes relocating a first table and a second table of a database to a first node of the database, wherein the first table and the second table are associated with one or more distribution keys corresponding to one or more columns of the first table and the second table. The method further includes defining a colocation relationship between the first table and the second table based on a distribution key of the one or more distribution keys. The colocation relationship indicates the data of the first table and the second table that correspond according to the distribution key are to reside on a same node of the database. The method may improve throughput performance and data availability by ensuring that all join queries require data from a single DN.

The method may further include receiving a request to move a set of data of the first table from the first node to a second node of the database. The method may further include determining, based on the colocation relationship and the first set of data, a second set of data of the second table (or of multiple tables, including the second table, having a colocation relationship with the first table) corresponding to the first set of the data of the first table. The method may further include moving the first set of data and the second set of data from the first node to the second node. The method may reduce overhead by ensuring that colocated data reside on the same node, thereby requiring access to a single DN for queries.

Moving the first set of data and the second set of data from the first node to the second node may include generating one or more partitions defining the first set of data and the second set of data. Generating the one or more partitions defining the first set of data and the second set of data may include dividing at least one partition of one or more of: the first table and the second table (or one or more tables which have a colocation relationship with the first table, of which the second table is an example), to generate the one or more partitions. The method may allow for dynamic partitioning of related data, thereby enabling and ensuring preservation of colocation relationship.

Moving the first set of data and the second set of data from the first node to the second node may include moving the one or more partitions from the first node to the second node. The method may ensure that related data partitions from two or more tables reside on a same DN.

According to another aspect, another method is provided. The method includes creating a first table and a second table for a database. The method further includes defining one or more distribution keys for the first table and the second table based on one or more columns of the first table and the second table. The method further includes defining a colocation relationship between the first table and the second table based on at least one distribution key of the one or more distribution keys. The colocation relationship may indicate that data of the first table and the second table that correspond according to the distribution key are to reside on a same node of the database. The method may improve throughput performance and data availability by ensuring that all join queries require data from a single DN.

The method may further include receiving a request to move a set of data of the first table from a first node of the database to a second node of the database. The method may further include determining, based on the colocation relationship and the first set of data, a second set of data of the second table (or one or more tables which have a colocation relationship with the first table, of which the second table is an example) corresponding to the first set of the data of the first table. The method may further include moving the first set of data and the second set of data from the first node to the second node. The method may reduce overhead by ensuring requiring data from a single DN, thereby requiring access to a single DN for queries.

Moving the first set of data and the second set of data from the first node to the second node may include generating one or more partitions defining the first set of data and the second set of data. The method may allow for dynamic partitioning of related data, thereby enabling and ensuring preservation of colocation relationship.

Generating the one or more partitions defining the first set of data and the second set of data may include dividing at least one partition of one or more of: the first table and the second table (or one or more tables which have a colocation relationship with the first table, of which the second table is an example), to generate the one or more partitions.

Moving the first set of data and the second set of data from the first node to the second node may include moving the one or more partitions from the first node to the second node. The method may ensure that related data partitions from two or more tables reside on a same DN.

According to another aspect, another method is provided. The method includes receiving a request to move data of a first table from a first node of a database to a second node of the database. The method may further include determining one or more other tables having a colocation relationship with the first table based on a mutual column or columns. The method may further include determining one or more partition boundaries based on the data and the one or more other tables. The method may further include generating, based on the one or more partition boundaries, a set of partitions associated with one or more of: the first table and the one or more other tables. The method may further include moving one or more partitions from the set of partitions from the first node to the second node. The method may improve throughput performance and data availability by ensuring that all join queries require data from a single DN.

The colocation relationship may indicate that data of the first table and the one or more other tables that correspond according to the mutual column or columns are to reside on a same node of the database. The method may reduce overhead by ensuring that colocated data reside on the same node.

Generating, based on the one or more partition boundaries, the set of partitions may include dividing at least one partition of one or more of: the first table and the one or more other tables, to generate the one or more partitions, wherein the one or more partitions includes the data of the first table and data of the one or more other tables that correspond to the data of the first table according to the colocation relationship. The method may allow for dynamic partitioning of related data, thereby enabling and ensuring preservation of colocation relationship.

Moving the one or more partitions from the set of partitions from the first node to the second node may include, for each partition of the one or more partitions, obtaining, from the first node, data associated with said each partition. Moving the one or more partitions from the set of partitions from the first node to the second node may further include, for each partition of the one or more partitions, creating, at the second node, a corresponding partition for the data associated with said each partition. The method may reduce overhead by ensuring that colocated data reside on the same node, thereby requiring access to a single DN for queries.

According to another aspect, an apparatus is provided. The apparatus includes modules configured to perform one or more of the methods described herein.

According to another aspect, another apparatus is provided, where the apparatus includes: a memory, configured to store a program; a processor, configured to execute the program stored in the memory, and when the program stored in the memory is executed, the processor is configured to perform one or more of the methods described herein.

For example, according to some embodiments, there is provided an apparatus comprising at least one processor and at least one machine-readable medium storing executable instructions. The instructions, when executed by the at least one processor cause the apparatus to relocate a first table and a second table of a database to a first node of the database. The first table and the second table are associated with one or more distribution keys corresponding to one or more columns of the first table and the second table. The instructions further cause the apparatus to define a colocation relationship between the first table and the second table based on a distribution key of the one or more distribution keys. The colocation relationship indicates that data of the first table and the second table that correspond according to the distribution key are to reside on a same node of the database.

According to another aspect, a computer readable medium is provided, where the computer readable medium stores program code executed by a device, and the program code is used to perform one or more of the methods described herein.

According to another aspect, a chip is provided, where the chip includes a processor and a data interface, and the processor reads, by using the data interface, an instruction stored in a memory, to perform one or more of the methods described herein.

Embodiments have been described above in conjunction with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 1A illustrates hash partitioning.

FIG. 1B illustrates range portioning.

FIG. 9 illustrates a method, according to an embodiment of the present disclosure.

FIG. 11 illustrates another method, according to an embodiment of the present disclosure.

DETAILED DESCRIPTION

Figure 2:
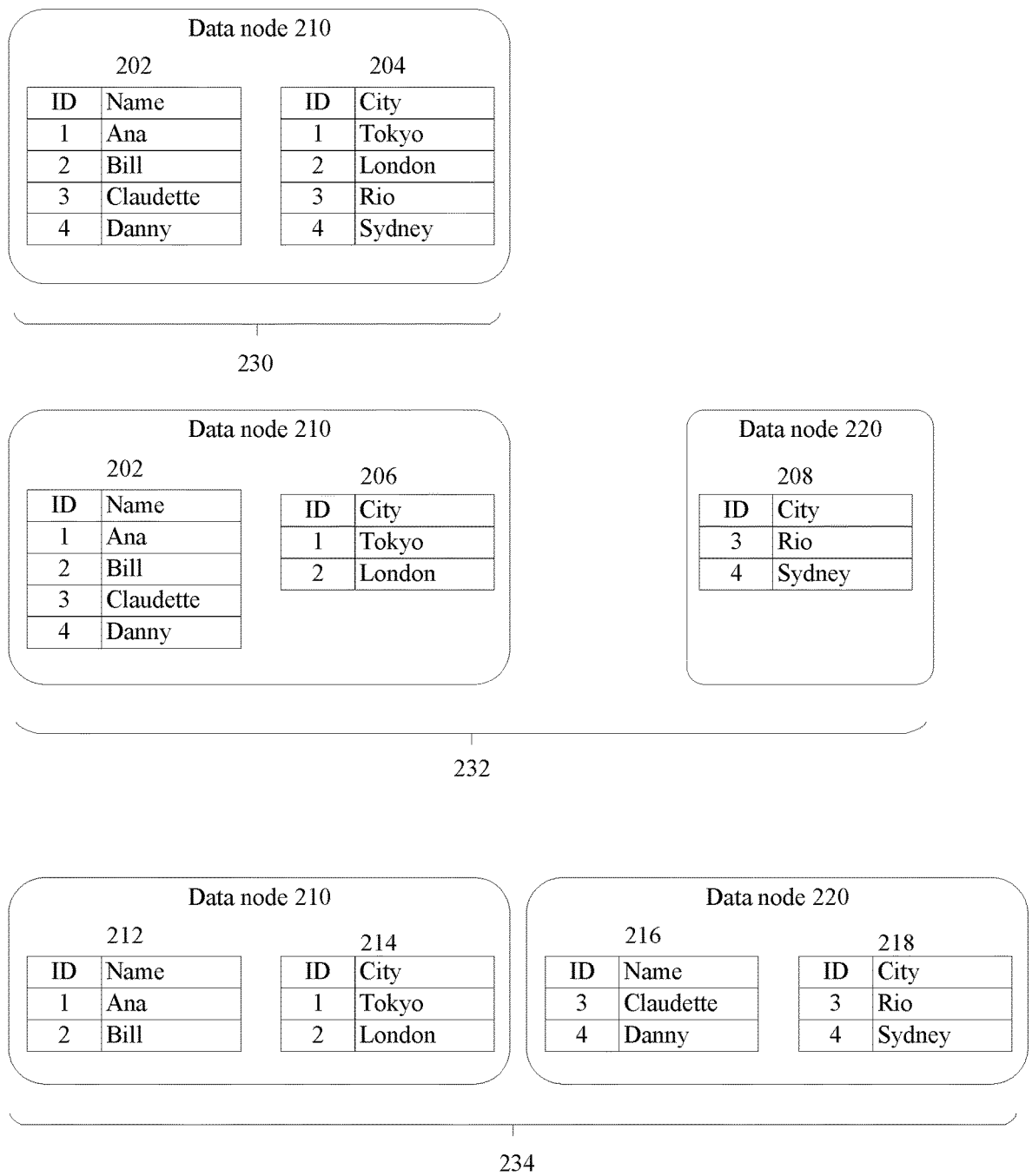
FIG. 2 illustrates use of a load balancer for managing data.

In a shared nothing architecture, data is spread across multiple DNs in a computer cluster with minimal overlap so that updates to the data can be serviced by a single node. A DN may refer to a computing node of a machine cluster that has access to the physical data.

The shared nothing architecture may enable ease of scaling the database by simply adding nodes and eliminates the need for most shared resources (as each node has its own processor, memory and storage). To achieve optimal performance, structured query language (SQL) statement requests are ideally satisfied by a single node to reduce contention among nodes.

Requests that require data from multiple DNs may dramatically reduce throughput due to network delays, especially if the DNs are located in different availability zones (AZs). An AZ may refer to one or more isolated locations for storing data. In some aspects, multiple AZs may be in different geographical areas. In some circumstances, a query may take some time to execute, for example, due to one or more reasons which may include accessing multiple AZs and requiring data from multiple DNs. Such queries may lead to long query execution which may further lead to additional contention and frequent transaction aborts.

Some existing methods for achieving improved database management performance use distribution keys. In such methods, data are organized across nodes by a "key" column or set of key columns. Identifying an effective distribution key can improve performance by spreading table data evenly across all DNs. Use of distribution keys works well when accessing data from a single table or joining multiple tables when the search key is the same as the distribution column. However, as partitions are moved across DNs, data from different tables with matching key values may reside in different DNs. This results in join queries having to access multiple DNs.

FIG. 1A illustrates hash partitioning. In FIG. 1A, a set of data 100 can be partitioned by a hash based on an identifier (ID). As illustrated, the set of data 100 is partitioned to DNs 102 and 104. A hash function operating on the ID determines where the data with the operand ID is to be stored. In the example of FIG. 1A, the hash function maps IDs 1 and 4 to DN 102 and maps IDs 2 and 3 to DN 104. FIG. 1B illustrates range partitioning. The set of data 100 is partitioned to DNs 106 and 108. The range table indicates which ranges of IDs each DN is to physically store. In the example of FIG. 1B, DN 106 stores IDs from 1 to 3, and DN 108 stores IDs 4 and above.

Some existing methods for managing data in database system use load balancers. As partitions get moved to different nodes or data becomes skewed due to extending data, load balancers may be used to study workload performance over time and move data across data nodes. However, use of load balancers is a reactive approach which may require time to study workload behavior prior to applying adjustments. As a result, throughput may suffer during the time between when a partition is moved and when the load balancer re-adjusts the partitions.

FIG. 2 illustrates use of a load balancer for managing data. Initially, at state 230, DN 210 includes tables 202 and 204, which represent names and locations, related together by an identification number for each person. In the following description, data portion 208 is a portion of the data from table 204, and data portion 206 is another portion of the data from table 204, such that, for example, data portions 206 and 208 are disjoint and together comprise all the data of table 204 (i.e. table 204 is partitioned into data portions 206 and 208). Furthermore, data portions 212 and 214 are portions of tables 202 and 204, respectively, and data portions 216 and 218 are other portions of tables 202 and 204, respectively. It is noted that data portions 212 and 216 are disjoint and together comprise all the data of table 202 (i.e. table 202 is partitioned into data portions 212 and 216), while data portions 214 and 218 are disjoint and together comprise all the data of table 204 (i.e. table 204 is partitioned into data portions 214 and 218). Moreover, data portions 212 and 214 correspond to the sections (parts of) of tables 202 and 204 with IDs 1 and 2, while data portions 216 and 218 correspond to sections (parts of) of tables 202 and 204 with IDs 3 and 4. Data portions can be held in tables, as appropriate.

At state 232, the database is expanded by adding DN 220. To use the new DN 220, some data (e.g., data portion 208), may be moved to the new DN 220, while some data (e.g., table 202 and data portion 206), may be kept at DN 210. Given state 232, a join query linking the names to the location may require the data from both DNs 210 and 220. For example, the following join query: "SELECT t1.name, t2.location from t1, t2 where t1.ID=t2.ID and t1.ID=3" Such a query will require data from both DNs 210 and 220.

A load balancer can be used to identify the problem in state 232 and improve data management as illustrated in state 234. Data is now organized in each DN based on their corresponding ID as illustrated. DN 210 includes data portions 212 and 214 and DN 220 now includes data portions 216 and 218. Given state 234, the above join query ("SELECT t1.name, t2.location from t1, t2 where t1.ID=t2.ID and t1.ID=3") may now only require data from DN 220.

Some existing methods of managing data are based on establishing a parent-child relationship between tables. In such methods, the child or "interleaved" table is defined to have all its rows physically stored together with the associated parent row. As such, SQL requests requiring a join on the parent and child tables only need to access one storage location. Further, the data locality relationship is preserved when database splits the data. However, preservation of data locality comes at the cost of size restriction for a single "parent" row and all its "child" rows, which cannot exceed a certain memory size, for example 8 GB. In such methods, there must not exist a hotspot in any of the child rows, for example a hotspot can define a section of data which may receive a significant (e.g. greater than a first threshold) number of access requests within a short (e.g. less than a second threshold) period of time. Further, if only parent rows are accessed without joining the child rows, more storage locations may be required to be read, e.g., "jumping" over the child rows. Another limitation of such methods is their inapplicability to complex colocation relationships without excessive overhead on the physical structure of a table.

According to an aspect, a framework related to multi-node storage is provided that may avoid requiring data accessed from multiple nodes when executing SQL queries. According to another aspect, a method related to multi-node data storage is provided which may obviate the need to require data from multiple nodes when executing SQL queries. Some aspects may provide improvements that resolve the problem of reduced throughput and degraded performance from multiple node SQL queries, particularly for SQL statements that require joins among multiple tables.

According to some aspects, columns of multiple tables may be colocated (e.g., reside on the same DN) or have a colocation relationship. The colocation relationship may be defined by using a new CREATE TABLE statement clause. In some aspects, during table creation, a colocation key between tables may be specified based on one or more columns in the distribution key, for example, using the clause COLOCATION COLUMN (column_name) COLOCATE WITH (table_name). As a result of the colocation relationship, any two tuples from the colocated tables whose values match along the colocation column or columns may be stored on the same DN.

Distribution key may refer to a mapping of where data is stored. Distribution key may further refer to one or more columns according to which a partition may be defined (e.g., based on a range of values corresponding to the one or more columns defining the one or more distribution keys).

In some aspects, a colocation relationship (e.g., a colocation key column) may be defined based on how the tables are related and may typically be joined in most frequently run statements to achieve the most benefits.

In some aspects, colocation condition may be preserved when data is moved from one node to another. For example, when some data is to be moved from one node to another, data from other colocated tables may be determined to be moved as well, to preserve the colocation condition. Accordingly, SQL join queries along the colocation column may only require data from a single node due to the collation of the tables, and thus may reduce the overhead resulting from multiple node queries.

Figure 3:
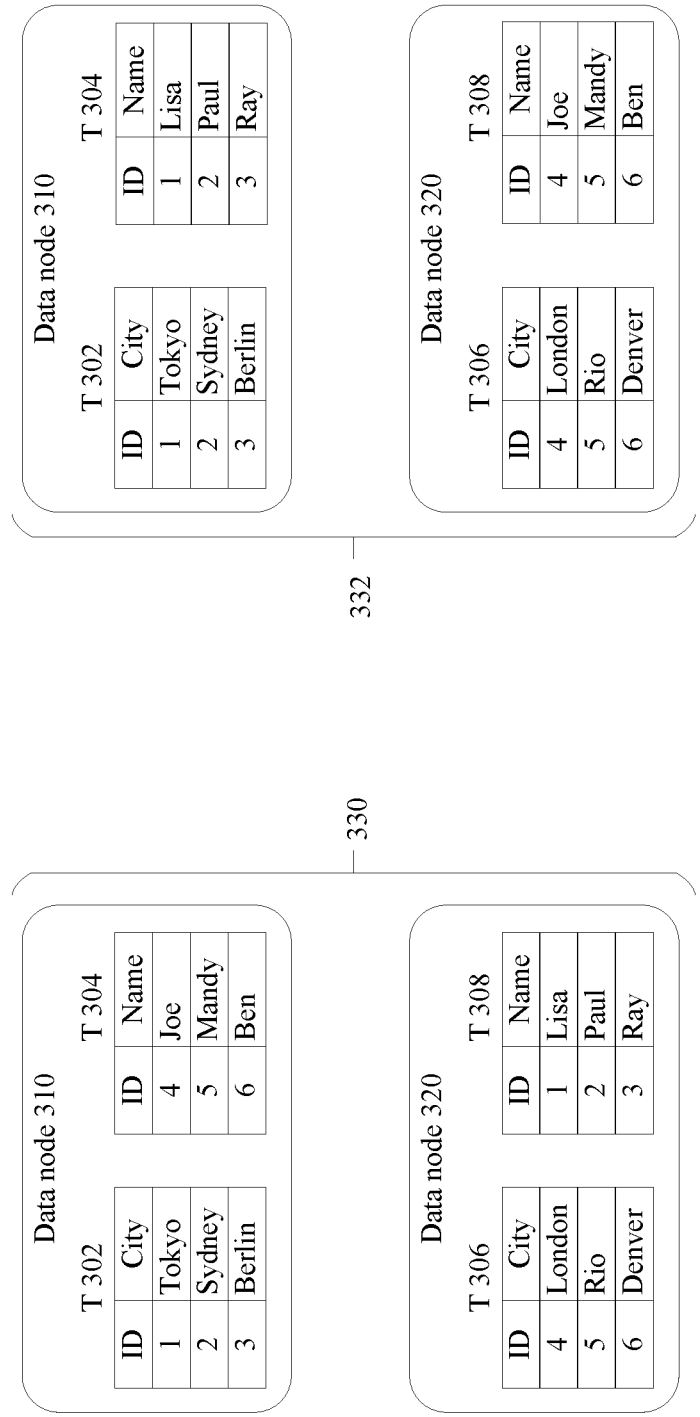
FIG. 3 illustrates a colocation relationship, according to an embodiment of the present disclosure.

FIG. 3 illustrates a colocation relationship, according to an aspect of the present disclosure. DN 310 and 320 may belong to a distributed database. State 330 may refer to a state in which a colocation relationship is not defined. At state 330 DN 310 may include table portions 302, 304, and DN 320 may include table portions 306 and 308. As illustrated, each table portion 302 and 306 (which may be portions of a same table stored on different DNs) may include two columns indicating identifiers (IDs) and associated cities. While each table portion 304 and 308 (which may be portions of another same table stored on different DNs) may include two columns indicating IDs and associated name. At state 330, data from table portions 302, 304, 306 and 308 joining on column ID may reside on different data nodes as illustrated. Consequently, at state 330, the data at DN 310 and DN 320 may not be efficiently stored, since the tables in each DN have different ID information. As such, a SQL join query at state 330 may require data from both DN 310 and 320.

In some aspects, state 332 may represent a state of the distributed database in which a colocation relationship is defined. At state 332, data from table portions 302, 304 and 306 and 308 joining on column ID may be guaranteed to reside on the same DN as illustrated. Accordingly, a SQL join query at state 332 may only require data from a single node.

In some aspects, a colocation requirement may be defined as follows: let T1 and T2 be two tables with columns T1($c_1$, $c_2$, $c_3$, . . . , $c_n$) and T2($d_1$, $d_2$, $d_3$, . . . , $d_m$), respectively. In an aspect, T2 may be colocated with T1 on columns ($d_1 \rightarrow c_1$, $d_2 \rightarrow d_k \rightarrow_c k$) if all rows of T1 and T2 that agree on the values of the colocation columns reside on the same DN. In some aspects, T2 being colocated with T1 on columns ($d_1 \rightarrow c_1$, $d_2 \rightarrow c_2$, . . . , $d_k \rightarrow_c k$) may require T1 to be colocated with itself on those columns.

For ease of notation, in some aspects, two columns that are bound by a colocation relationship may be given the same name (i.e., $c_i$ of T1 may be colocated with $c_i$ of T2). In some aspects, every column of the tables may be assumed to be distribution a key column (e.g non-key columns in the tables that do not factor into the location of the data). For example, in the definition above, T1 may have n distribution key columns and T2 may have m distribution key columns. In some aspects, k, the number of colocation columns, may be less than or equal to both n and m. Columns after the $k^{th}$ column may be ignored (e.g. not considered) for determining the location of data.

Some aspects of the disclosure may apply to databases which support dynamic partitioning (i.e., the ranges can be modified after the table is created). In some aspects, the values or set of values for each distribution column may be based on a totally ordered set (e.g., floats, integers, strings and the like). In some aspects, the type or form of values used for each distribution column may have deterministic features for allowing dynamic partitioning. For example, the values for each distribution column may be such that, with respect to a set of values for each distribution column, one or more of the following may be dynamically determined: a maximum value, a minimum value, and range of values.

According to some aspects, a method is provided that may maintain or preserve colocation relationship among two or more tables.

In some aspects, the range of T1 spanning from [{$v_1$, $v_2$, . . . , $v_n$}→{$w_1$, $w_2$, $w_n$}] may be moved from a first DN to a second DN. In some aspects, tables colocated with T1 along the columns ($c_1$, $c_2$, $c_3$, . . . , $c_k$) may be identified. For each such identified table $T_i(c_1, c_2, \ldots, c_m)$ one or more operations may be performed.

In an aspect, for each identified table $T_i(c_1, c_2, \ldots, c_m)$, for j from k+1 to m, the minimum possible value for each column $c_{k+1}, \ldots, c_m$ may be determined and denoted as $MIN_{k+1}, MIN_m$. For example, if column $c_j$ stores a 32-bit signed integer then $MIN_j$ may be −2147483648. Similarly, for column $c_j$ which stores a 32-bit signed integer, the $MAX_j$ may be 2147483648.

In some aspects, for each identified table $T_i(c_1, c_2, \ldots, c_m)$, the smallest possible value that is greater than $w_k$ may be determined and denoted as $NEXT_k$. For example, if $w_k$ is an integer with the value 5 then $NEXT_k$=6.

In some aspects, for each identified table $T_i(c_1, c_2, \ldots, c_m)$, the partitions of $T_i$ may be split so that there exist ranges whose boundaries are $L_i$={$v_1$, $v_2$, . . . , $v_k$, $MIN_{k+1}$, . . . , $MIN_m$} and $U_i$={$w_1$, $w_2$, . . . , $NEXT_k$, $MIN_{k+1}$, . . . , $MIN_m$}, corresponding to the lower and upper bounds of the original range that is to be moved.

In some aspects, for each identified table $T_i(c_1, c_2, \ldots, c_m)$, partitions that reside between $L_i$ and $U_i$ may be moved from the first DN to the second DN. In some aspects, the move operations for tables colocated with T1 may performed within a single transaction so that, either, all of these operations succeed or all of the operations fail. In some aspects, there may not exist a transaction that can see the effect of one move operation (e.g., moving table T1) without all of the other operations (e.g., moving all tables colocated with T1).

In some aspects more than two tables may be colocated or have a colocation relationship. For example, a first table and a second table may have a colocation relationship along a first column via defining or assigning a colocation relationship between the two tables. A third table may also have a colocation relationship with both the first table and the second table. For example, a colocation relationship may be defined or assigned between the third table and either of the first table or the second table along the same first column.

Similarly, further colocation relationships may be defined between one or more additional tables and one or more of the first, second and third table.

Figure 4:
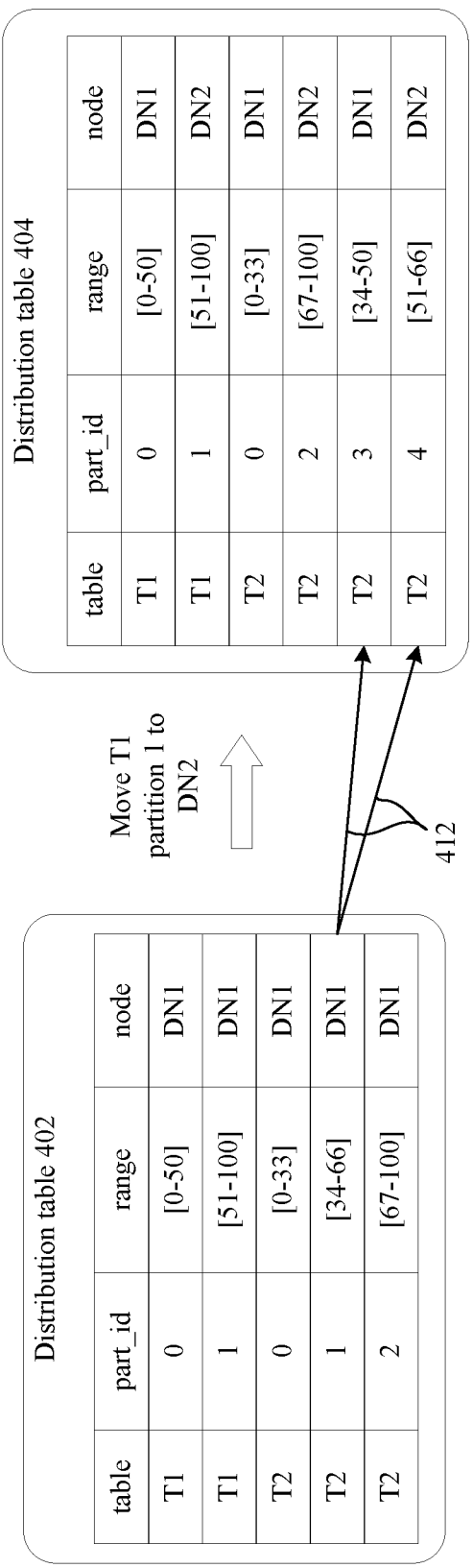
FIG. 4 illustrates an example of movement of data in a distributed database, according to an embodiment of the present disclosure.

FIG. 4 illustrates an example of movement of data in a distributed database, according to an aspect. In an aspect, data relating to tables T1 and T2 may be stored according to a database catalog 402. A database catalog may indicate a collection of partitions, associated with one or more tables, and the partitions' locations.

Each of T1 and T2 may include a column indicating an ID, and one or more other columns indicating other information. In an aspect T1 and T2 may be defined based on a single distribution key, e.g., the ID column. In an aspect, T1 and T2 may have a colocation relationship along the column ID. In some aspects, the colocation relationship may be defined at table creation. In some aspects, the colocation relationship may be defined after table creation, for example, when T1 and T2 are colocated, i.e., reside in the same node or location, as may be the case according to database catalog 402.

As illustrated, T1 may include partitions 0 and 1 having ranges [0-50] and [51-100], respectively. T2 may include partitions 0, 1, and 2, having ranges [0-33], [34-66], and [67-100] respectively. All T1 partitions, e.g., partitions 0, and 1, and all T2 partitions, e.g., partitions 0, 1, and 2 may reside at DN1.

In an aspect, partition 1 of T1 may be decided to be moved from DN1 to DN2. Given T1 has a colocation relationship with T2 along the column ID, the corresponding data of T2, relating to ID values that correspond to the ID values of partition 1 of T2, may also be moved from DN1 to DN2.

Thus, based on the colocation relationship, some data of partition 1 of T2, may also be determined to be moved to DN2, as part of moving partition 1 of T1 from DN1 to DN2. For example, according to the colocation relation between T1 and T2, partition 2 of T2 and a portion of partition 1 of T2 may be determined to be moved to DN2 with the partition 1 of T$_i$.

In an aspect, since a portion of partition 1 of T2 is determined to be moved, the range of partition 1 of T2, as shown in database catalog 402, may be split 412 according to the colocation relationship between T2 and T1. For example, the range of partition 1 of T2 may be split from [34-66] to ranges [34-50] and [51-66] as indicated by partition 3 and 4 of T2 in database catalog 404.

Accordingly, based on the colocation relationship between T1 and T2, when moving partition 1 of T1 from DN1 to DN2, partition 2 and partition 4 of T2 may also be moved from DN1 to DN2, as illustrated in database catalog 404.

In the illustrated example, a whole partition of T1, e.g., partition 1, is moved from DN1 to DN2. In some aspects, only a portion of a partition, e.g., partition 1, of T1 may be moved. In such aspects, the relevant partition may be split or divided into two or more partitions according to the portion of the partition that may need to be moved. Similarly, due to the colocation relationship between T1 and T2, the data of T2 corresponding to the portion of T1 that needs to be moved, as defined according to the colocation relationship, may also be moved in one transaction. The movement of data of T2 corresponding to the portion of T1 that needs to be moved may also require further appropriate splitting or divisions of one or more partitions of T2.

Figure 5:
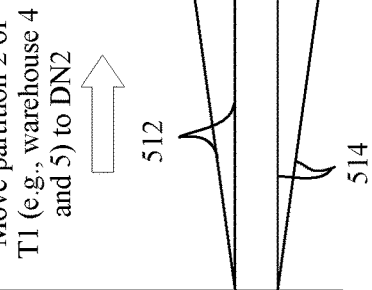
FIG. 5 illustrates an example of movement of data, according to an embodiment of the present disclosure.

FIG. 5 illustrates an example of movement of data, according to an aspect. In an aspect, data relating to tables T1 502 and T2 504 may be stored according to the distribution table 510. In some aspects, the distribution table 510 and 520 may be similar to the database catalogue 402 and 404 indicating values or range of values of the one or more tables (e.g., in terms of partitions) and their location within the database.

Referring to FIG. 5, T1 502 may include one or more columns indicating: warehouse, district, customer, price, etc. T2 504 may include one or more columns indicating: warehouse, district, stock, item, etc. In an aspect, the warehouse column and the district column may be used as distribution keys. Thus, T1 and T2 may be defined based on two distribution keys.

In an aspect, each table may have one or more partitions indicating a range of values as illustrated in the distribution table 502. In an aspect, tables T1 and T2 may have a colocation relationship based on the warehouse column. In an aspect, the colocation relationship may be defined at table creation. In some aspects, the colocation relationship may be defined after table creation.

As may be appreciated by a person skilled in the art, the range of values for a partition may follow a variety of convention types. For example, the upper bound of a range of a partition may be non-inclusive. For example, partition 1 of T2, having ranges of (1, MIN) to (2, MIN), may exclude the upper bound being, (2, MIN). Thus partition 1 of T2 may include only and all warehouses having value of 1. In some aspects, the MIN and MAX value may refer to the minimum value and the maximum value, respectively, that a column may have.

In an aspect, data relating to warehouses values 4 and 5 of T1. i.e., partition 2 of T1, may be moved to DN2. Given T1 has a colocation relationship with T2 along the column warehouse, the corresponding data of T2, relating to warehouse values of 4 and 5 may also be moved to DN2. As indicated in the distribution table 510, the corresponding data of T2, relating to warehouse values of 4 and 5 fall within partitions 2 and 3 of T2. In some aspects, all of the partitions 2 and 3 of T2, ranging from (2, MIN) to (7, MIN), may be moved to DN2.

In some aspects, based on the colocation relationship between T2 and T1, partitions 2 and 3 of T2 may be split such that only corresponding data of T2, relating to warehouse values of 4 and 5 may be moved to DN2, along with partition 2 of T1 (e.g., warehouse 4 and 5).

In an aspect, partition 2 may be split 512 into partitions 5 and 6, having ranges (2, MIN) to (4, MIN) and (4, MIN) to (5, 5), respectively, as illustrated in distribution table 520. Similarly, partition 3 may be split 514 into partitions 7 and 8, having ranges (5, 5) to (6, MIN) and (6, MIN) to (7, MIN), respectively, as also illustrated in distribution table 520.

Accordingly, partitions 6 and 7 of T2, corresponding to data relating to warehouse values of 4 and 5 may be moved to DN2, along with partition 2 of T1. In some aspects, the relocation of data relating to warehouse values of 4 and 5 of T1 and T2 may be done in one transaction.

As may be appreciated by a person skilled in the art, in some aspects, the number of distribution keys may affect how data may be split. For example, in reference to FIGS. 4, T1 and T2 may be defined based on a single distribution key, the column ID. Accordingly, the splitting of partition 1 of T2, due to the colocation relationship between T1 and T2, may be based on the values of the distribution key, namely ID values. Whereas, in reference to FIGS. 5, T1 and T2 may be defined based on two distribution keys, the warehouse column and the district column. Accordingly, the splitting of partitions 2 and 3 of T2, may be based on the values of the distribution keys, namely the warehouse values and the district values. Similarly, for databases having more than two distribution keys, a similar approach to splitting data or dividing partitions in two or more partitions may be taken, as may be appreciated by a person skilled in the art.

Aspects of the disclosure may apply to or be implemented via a distributed database. In some aspects, a database management system (DBMS) may refer to a software acting as an interface between an underlying database and one or more of: end users and applications.

Some aspects of the disclosure may be implemented via GaussDB, a Huawei™ database management system (DBMS). While the GaussDB may be based on a static partitioning scheme (where partition ranges are stored in the metadata catalog table), in some aspects, dynamic range partitioning may be supplemented or supported to further enhance the database. Dynamic range partitioning may allow for each range to be split and moved across DNs. In some aspects, the distributed database may be further enhanced via supplementing the database with the colocation support.

In some aspects, a user may be enabled to define one or more colocation columns as well as defining one or more relationships between two or more tables. For example, some aspects may provide a CREATE TABLE statement using the following clauses:
COLOCATION COLUMN (<column names>)
COLOCATE WITH (<table name>)
As an example, the following statements may create two tables T1 and T2 whose c1 columns are colocated with each other:
CREATE TABLE T1 (c1 int, c2 int) DISTRIBUTE BY RANGE (c1) COLOCATION COLUMN (c1);
CREATE TABLE T2(c1 int, c2 text) DISTRIBUTE BY RANGE (c1) COLOCATE WITH (T1);

In some aspects, a coordinator node (CN) of a database may refer to a node of a machine cluster that handles user requests and determines the appropriate data node(s) to service the request. In some aspects, CNs, e.g., CNs in GaussDB, may be responsible for determining which DNs are to be involved in a query. The CNs may read one or more distribution tables (e.g., 402, 404, 510 or 520) to determine which DNs have access to or contain the required data. In some aspects, the CNs may read one or more distribution tables according to the range partitioning system. Distribution tables may also be referred to as database catalog tables. In some aspects, a partition (of a table) may be moved from one DN to another, while preserving the colocation relationship associated with the table, as described herein.

In some embodiments, when hash partitioning is implemented (e.g. as described for example with respect to FIG. 1A), instead of reading a distribution table, a CN may compute the DN location by applying a hash function on the relevant columns of data.

Figure 6:
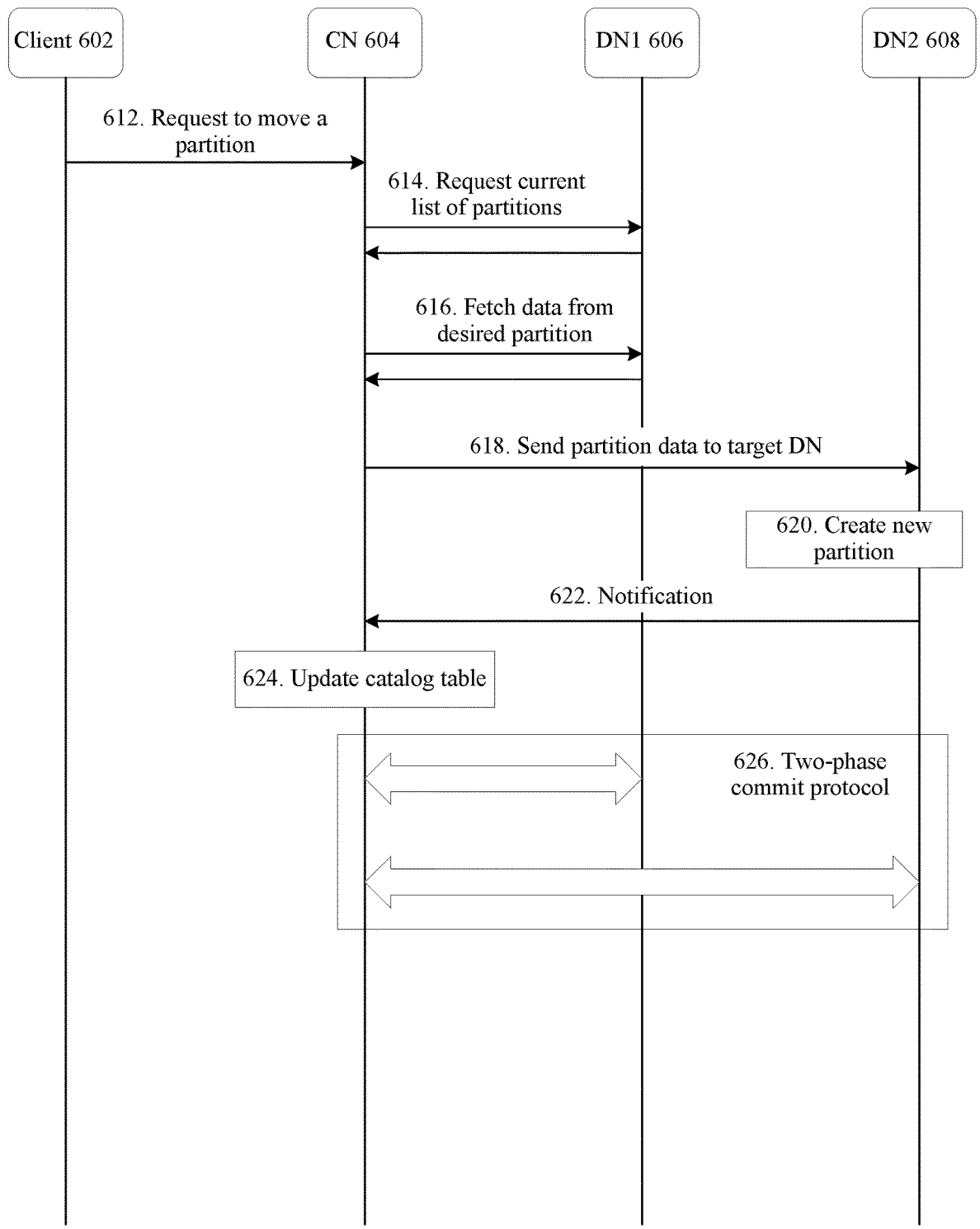
FIG. 6 illustrates a method for moving a partition, according to an embodiment of the present disclosure.

FIG. 6 illustrates a method for moving a partition, according to an aspect. The method 610 may include sending, by a client 602 to a CN 604, a request 612 to move some data (e.g., a partition) from DN1 606 to DN2 608. The method 610 may further include obtaining by CN 604 a current list of partitions from DN1 606. In some aspects, CN 604 may obtain the current list of partitions by sending to DN1 606 a request 614 for a current list of partition. DN1 606 may respond to CN 604 providing the list of partitions.

The method 610 may further include obtaining or fetching 616 by CN 604 from DN1 606 the data requested by the client. In some aspects, the fetching 616 of the requested data may include sending, by CN 604 to DN1, a request to send the requested data. DN1 606 may respond to CN 604 with the requested data.

The method 610 may further include sending 618, by CN 604 to DN2 608, the requested data. The method 610 may further include creating 620, by DN2 608, a new partition for the data received. The method 610 may further include sending a notification 622, by DN2 608 to CN 604, indicating the creation of the new partition. The method 610 may further include updating 624, by CN 604, a catalogue table of the database based on the notification 622.

The method 610 may further include performing 626 a two-phase commit protocol, which is a protocol for committing a transaction for distributed database systems, as may be appreciated by a person skilled in the art. For example, as would be readily understood a two-phase commit protocol may include a first commit-request phase, where a coordinator process attempts to prepare all the participating processes of the transaction to take the necessary actions. A two-phase commit protocol may further include a commit phase, where it is determined if the transaction is to be committed or aborted.

Figure 7:
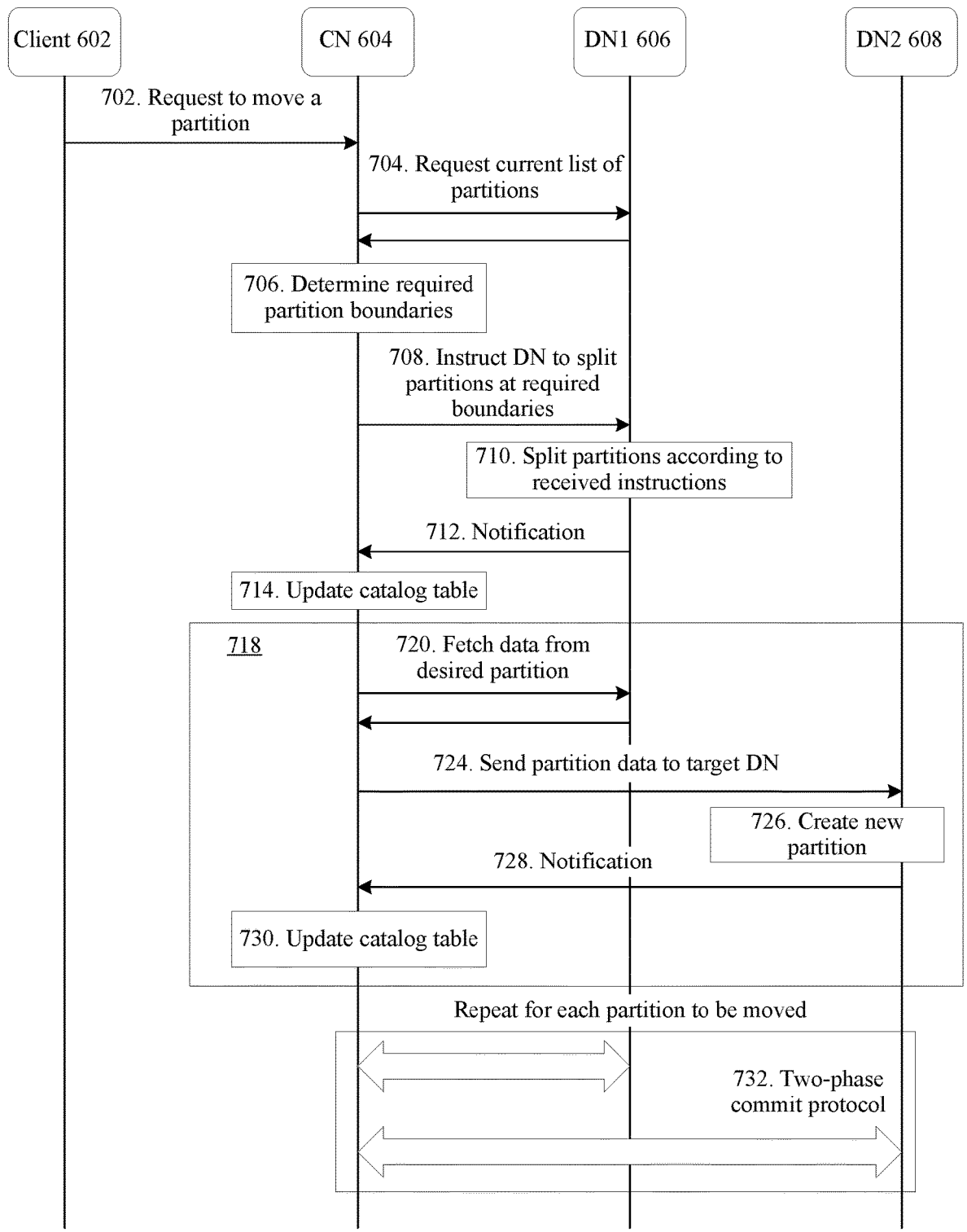
FIG. 7 illustrates a method for moving data based on a colocation relationship, according to an embodiment of the present disclosure.

FIG. 7 illustrates a method for moving data based on a colocation relationship, according to an aspect. The method 700 may include sending, by a client 602 to a CN 604, a request 702 to move some data (e.g., a partition or a portion of a partition, partition 1 of T1 of FIG. 4, and partition 2 of T1 of FIG. 5) from a first node, e.g., DN1 606, to a second node, e.g., DN2 608. The method 700 may further include obtaining by CN 604 a current list of partitions from DN1 606. In some aspects, CN 604 may obtain the current list of partitions by sending to DN1 606 a request 704 for a current list of partition. DN1 606 may respond to CN 604 providing the list of partitions.

In some aspects, the method 700 may further include determining 706, by CN 604, required partition boundaries, based on one or more of: the data requested from client 602, the received current list of partitions from DN1 606, and colocation relationship among two or more tables.

For example, in reference to FIG. 4, in moving partition 1 of T1, corresponding data of T2, based on the colocation relationship between T1 and T2, needed to be also moved. Determining the corresponding data of T2 required determining the partition boundaries of the new partitions 3 and 4, based on splitting partition 1 of T2, as described herein.

Similarly, in reference to FIG. 5, in moving partition 2 of T1, corresponding data of T2, based on the colocation relationship between T1 and T2, needed to be also moved. Determining the corresponding data of T2 required determining the partition boundaries of the new partitions 5 and 6 (based on splitting partition 2 of T2) and new partitions 7 and 8 (based on splitting partition 3 of T2), as described herein.

In some aspects, determining partition boundaries at block 706 may involve determining one or more tables having a colocated relationship. For example, the requested data to be moved may include data at a first table, e.g., T1. Based on T1's colocation relationship with one or more other tables, corresponding data from the one or more colocated tables may also be determined for moving. Accordingly, appropriate one or more partition boundaries based on one or more of: the requested data, list of existing partitions, and colocation relationship, may be determined. The one or more partition boundaries may be used to create or generate one or more partitions associated with T1 (the requested data of T1) and the one or more colocated tables (the corresponding data of the one or more colocated tables based on the colocation relationship).

In some aspects, the method 700 may further include, sending, by CN 604, instructions 708 to the DN that is currently storing the requested data, e.g., DN1 606. In some aspects, the instructions may indicate DN1 606 to divide one or more partitions based on required partition boundaries determined at block 706.

The method may further include splitting or dividing 710, by DN1 606, one or more partitions based on the instructions. In some aspects, DN1 606 may create or generate one or more new partitions based on partition boundaries determined at block 706 and included (information on required partition boundaries) in the instructions. In some aspects, DN1 606 may generate the one or more new partitions by dividing one or more existing partitions. In some aspects, the one or more new partitions generate may correspond to the requested data in request 702.

In some aspects, the method 700 may further include sending, by DN1 606 to CN 604, a notification 712 indicating the creation of the one or more new partitions. In some aspects, the notification may include information on the range of values corresponding for each of the created one or more new partitions. The range of values corresponding for each of the created one or more new partitions may be based on the determined required partition boundaries.

The method 700 may further include updating 714, by CN 604, a catalogue table of the database based on the notification 712.

In some aspects, one or more partitions may be determined, by CN 604, to be moved. The one or more partitions determined to be moved may be based one or more of: requested data, notification 712 (indicating the range of values corresponding for the newly created one or more partitions), determined partition boundaries, and one or more colocation relationships among the tables. Accordingly, in some aspects, the one or more new partitions determined to be moved may be defined by partition boundaries and include the requested data, and other data as determined based on the colocation relationship among the tables. For example, the requested data to be moved may include data at a first table, e.g., T1. Based on T1's colocation relationship with one or more other tables, corresponding data from the one or more colocated tables may also be determined for moving. Accordingly, appropriate one or more partition boundaries may be determined based on one or more of: the requested data, list of existing partitions, and colocation relationship. The one or more partition boundaries may be used to create or generate one or more partitions associated with T1 (the requested data of T1) and the one or more colocated tables (the corresponding data of the one or more colocated tables based on the colocation relationship).

In some aspects, with respect to each partition of the one or more new partitions determined to be moved, the method may further include one or more operations performed at 718.

In some aspects, with respect to each partition of the one or more new partitions determined to be moved, the method may further include, obtaining or fetching 720, by CN 604 from DN1 606, data of said partition. In some aspects, the fetching 616 of the data of said partition may include sending, by CN 604 to DN1 606, a request to send the data of the said partition. DN1 606 may respond to CN 604 with the requested data.

In some aspects, with respect to each partition of the one or more new partitions determined to be moved, the method may further include, sending 724, by CN 604 from DN1 606, the data of said partition received. In some aspects, the method 700 may further include creating 726, by DN2 608, a new partition for the data received. The method 700 may further include sending a notification 728, by DN2 608 to CN 604, indicating the creation of the new partition and information relating to the new partition (e.g., range of the partition, location (e.g., an address of the DN), and other relevant data). The method 700 may further include updating 730, by CN 604, a catalogue table associated with the database based on the notification 622.

After performing the one or more operations in block 718 with respect to each partition determined to be moved, in some aspects, the method 700 may further include performing 732 a two-phase commit protocol. In some aspects, all the operations in block 718 (for each partition to be moved), plus the two-phase commit protocol 732 may occur in one transaction, such that the protocol may commit if all partitions (that are determined to be moved) have been moved (e.g., operations at 718 are performed with respect all partitions to be moved). The performed 732 two-phase commit protocol may be regarded as finalizing the operations of (potentially multiple iterations of) block 718.

The two-phase commit protocol may allow a transaction to commit once all involved DNs (whether two or more DNs are involved) have saved the related write operations to disk. For example, CN 604 may send a "prepare" message to each of DN1 606 and DN2 608. Once each of the DN1 606 and DN2 608 have saved the related write operations to disk, indicating that the transaction is safe to commit, each of DN1 606 and DN2 608 may send an "OK" message back to CN 604. The transaction may then commit. Accordingly, the two-phase commit protocol may prevent any interim queries from occurring during the movement of the one or more partitions from DN1 to DN2.

In some aspects, the CN 604, in method 700, may be the same as or integrated with DN1 606 or DN2 608. For example, if CN 604 is the same as or integrated with DN1 606, the one or more operations involving CN 604 and DN1 606 may be internal to DN1 606. Similarly, if CN 604 is the same as or integrated with DN2 608, the one or more operations involving CN 604 and DN2 608 may be internal to DN2 608.

In some aspects, applicable to physical partitioning systems (i.e., each partition has a dedicated physical space allocated thereto), one or more operations may be needed for implementation. For example, one or more operations relating to: requesting 704 the list of operations and receiving said list, sending instructions 708 to divide one or more partitions based on required partition boundaries, dividing 710 one or more partitions, and sending notification 712, may be needed for physical partitioning systems.

In some aspects, applicable to logical partitioning systems, one or more operations in method 700 may be optional. For example, one or more operations relating to: requesting 704 the list of operations and receiving said list, sending instructions 708 to divide one or more partitions based on required partition boundaries, dividing 710 one or more partitions, and sending notification 712, may be optional for logical partitioning systems.

In some aspects, depending on the partitioning system, the CN 604 may perform one or more operations of the method 700 on its own, without requiring communication with the one or more DNs involved in moving the data. For example, in some partitioning systems, the CN 604 may be able to perform one or more operations of any of the DN, including partition splitting and creation, transmission of data from one DN to another, and other operations as may be permitted by the partitioning system.

Figure 8:
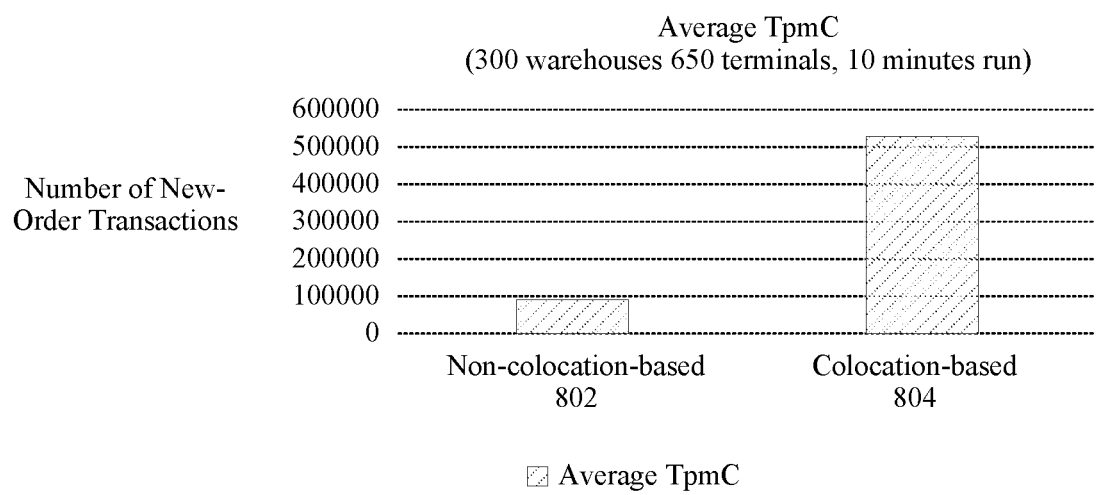
FIG. 8 illustrates a comparison of performance between a colocation-based database system and a non-colocation-based database system, according to an embodiment of the present disclosure.

FIG. 8 illustrates a comparison of performance between a colocation-based database system and a non-colocation-based database system, according to an aspect. FIG. 8 illustrates a comparison of database (e.g., GaussDB) performance, based on the average number of orders that can be fully processed per minute (expressed in tpm-C), between a colocation-based database system 804 and a non-colocation-based database system 802. As illustrated in, the colocation-based database system 804 may allow for an increased number of orders or transaction compared to the non-colocation-based database system 802. In some aspects, use of a colocation relationship (e.g., in the colocation-based database 804) may allow for a reduced number of multi-node SQL requests.

The results illustrated in graph 800 is based on the Transaction Processing Performance Council (TPC) benchmark C, which is an on-line transaction processing (OLTP) benchmark. As may be appreciated by a person skilled in the art, the TPC-C OLTP benchmark may simulate the workload of a wholesale supplier. The main structure of the workload may be based on a Warehouse table and all tables may have a column corresponding to the WarehouseID to specify which warehouse to which an entry belongs. The join queries of this workload may match columns on the warehouse ID.

The colocation-based database system may be achieved by defining a colocation relationship between the benchmark tables on the WarehouseID column (such that all entries corresponding to a single warehouse may be colocated or be located in the same DN). In some aspects, the colocation-based database system may allow for improved maximum throughput by ensuring or increasing the likelihood that all join queries require a single DN, while one or more partitions are being moved between different DNs.

As may be appreciated by a person skilled in the art, one or more aspects described herein may apply to a DBMS which follows a shared-nothing architecture. While some aspects provide for defining the colocation relationship by the CREATE TABLE command, a variety of methods of setting a property of a table may be used for defining the colocation relationship.

In some aspects, the colocation relationship may be defined or set after table creation or after data has been inserted, provided that data meets the colocation criteria at the time. For example, a colocation relationship may be defined between a first existing table and a second existing table, where each table may or may not include data. To establish a colocation relationship between the existing tables, in an aspect, both existing tables may be relocated to a same DN (if not already residing on a same DN), after which, a colocation relationship may be defined for the two tables. For example, the one or more DNs that may include the existing tables may be instructed to move the existing tables (e.g., data corresponding to the existing tables) to a same DN, thereby relocating both existing tables to a same DN. Once the existing tables reside on a same DN, a colocation relationship may be defined based on a distribution key associated with the existing tables.

In some aspects, the CN 604 may be the same as or integrated with any DN in the database. For example, the CN 604 may be same as or integrated with a DN that includes the requested data. Accordingly, one or more operations, as described in reference to FIG. 7, involving CN 604 and a DN including the requested data (e.g., DN1 606) may be internal to the DN (e.g., DN1 606).

While in some aspects, e.g., in reference to FIG. 4 and FIG. 5, the partitions and changes thereof revolve around the distribution table (e.g., 402 and 404 in FIGS. 4, 510 and 520 in FIG. 5). In some aspects, any data structure that records partition information may be suitable.

According to some aspects, the need to access multiple DNs for SQL queries that join data along colocated columns may be obviated or reduced. Due to the colocation relationship, colocated data may reside on the same DN, obviating or reducing the need to access multiple DNs.

FIG. 9 illustrates a method, according to an aspect. The method 900 may include, at block 902, relocating a first table and a second table of a database to a first node of the database. In some aspects, the first table and a second table may be associated with one or more distribution keys corresponding to one or more columns of the first table and the second table.

The method 900 may further include, at block 904, defining a colocation relationship between the first table and the second table based on a distribution key of the one or more distribution keys. In some aspects, the colocation relationship may indicate that data of the first table and the second table that correspond according to the distribution key are to reside on a same node of the database.

In some aspects, the method 900 may further include, at block 906, receiving a request to move a set of data of the first table from the first node to a second node of the database. In some aspects, the method 900 may further include, at block 908, determining, based on the colocation relationship and the first set of data, a second set of data of the second table corresponding to the first set of the data of the first table. In some aspects, the method 900 may further include, at block 910, moving the first set of data and the second set of data from the first node to the second node.

In some aspects, moving the first set of data and the second set of data from the first node to the second node may include generating one or more partitions defining the first set of data and the second set of data. In some aspects, generating the one or more partitions defining the first set of data and the second set of data may include dividing at least one partition of one or more of: the first table and the second table, to generate the one or more partitions.

In some aspects, moving the first set of data and the second set of data from the first node to the second node may include moving the one or more partitions from the first node to the second node.

Figure 10:
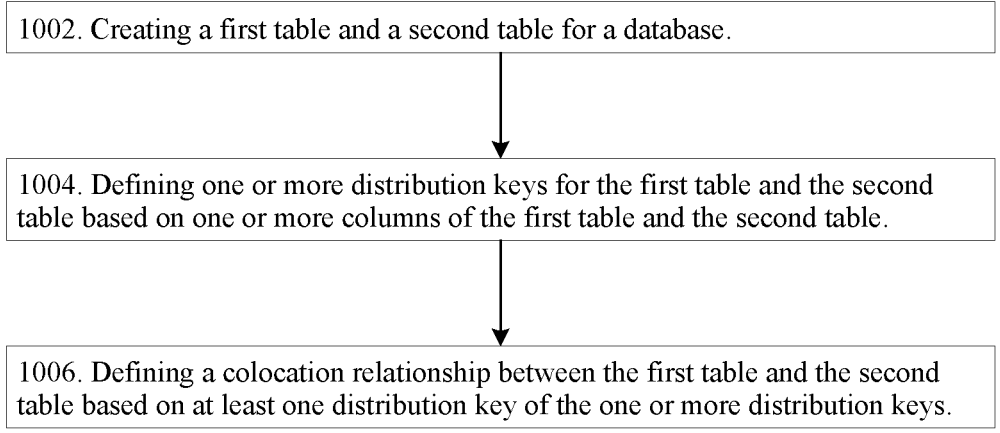
FIG. 10 illustrates another method, according to an embodiment of the present disclosure.

FIG. 10 illustrates another method, according to an aspect. The method 1000 may include, at block 1002, creating a first table and a second table for a database. The method 1000 may further include, at block 1004, defining one or more distribution keys for the first table and the second table based on one or more columns of the first table and the second table. The method 1000 may further include, at block 1006, defining a colocation relationship between the first table and the second table based on at least one distribution key of the one or more distribution keys. In some aspects, the colocation relationship may indicate that data of the first table and the second table that correspond according to the distribution key are to reside on a same node of the database.

In some aspects, the method 1000 may further include receiving a request to move a set of data of the first table from a first node of the database to a second node of the database. In some aspects, the method 1000 may further include determining, based on the colocation relationship and the first set of data, a second set of data of the second table corresponding to the first set of the data of the first table. In some aspects, the method 1000 may further include moving the first set of data and the second set of data from the first node to the second node.

In some aspects, moving the first set of data and the second set of data from the first node to the second node may include generating one or more partitions defining the first set of data and the second set of data.

In some aspects, generating the one or more partitions defining the first set of data and the second set of data may include dividing at least one partition of one or more of: the first table and the second table, to generate the one or more partitions.

In some aspects, moving the first set of data and the second set of data from the first node to the second node may include moving the one or more partitions from the first node to the second node.

FIG. 11 illustrates another method, according to an aspect. The method 1100 may include, at block 1102, receiving a request to move data of a first table from a first node of a database to a second node of the database. The method 1100 may further include, at block 1104, determining one or more other tables having a colocation relationship with the first table based on a mutual column. The method 1100 may further include, at block 1106, determining one or more partition boundaries based on the data and the one or more other tables. The method 1100 may further include, at block 1108, generating, based on the one or more partition boundaries, a set of partitions associated with one or more of: the first table and the one or more other tables. The method 1100 may further include, at block 1110, moving one or more partitions from the set of partitions from the first node to the second node.

In some aspects, the colocation relationship may indicate that data of the first table and the one or more other tables that correspond according to the mutual column are to reside on a same node of the database.

In some aspects, generating, based on the one or more partition boundaries, the set of partitions may include dividing at least one partition of one or more of: the first table and the one or more other tables, to generate the one or more partitions. In some aspects, the one or more partitions may include the data of the first table and data of the one or more other tables that correspond to the data of the first table according to the colocation relationship.

In some aspects, moving the one or more partitions from the set of partitions from the first node to the second node may include, for each partition of the one or more partitions, obtaining, from the first node, data associated with said each partition. In some aspects, moving the one or more partitions from the set of partitions from the first node to the second node may further include, for each partition of the one or more partitions, creating, at the second node, a corresponding partition for the data associated with said each partition.

According to some aspects, data across multiple tables that are commonly accessed together may be guaranteed or have an increased likelihood to reside on the same DN due to the colocation feature. Accordingly, in some aspects, performance of fulfilling SQL request may be improved since the CN may only need to communicate with a single DN compared to multiple DNs.

In some aspects, query plan generations (by a query compiler) may be improved (i.e., query plans may be generated at an improved rate) as fewer plan variations may be available with single DN access. In some aspects, availability to serve SQL requests (e.g., when a DN is down) may also be improved due to single-DN access compared to the need to access multiple DNs.

In some aspects, colocation may be preserved without much overhead as data grows. Unlike existing technology, e.g., Cloud Spanner™, where colocation is maintained at physical storage level, according to some aspects, colocated tables may be kept separate and overhead kept low when partitions are split dynamically.

According to some aspects, a more dynamic colocation relationship may be provided compared to existing technology, e.g., Cloud Spanner™, which may require extra overhead even without any movement of data.

According to some aspects, user intervention, to ensure related data partitions across multiple tables reside on the same DN, may be prevented. For example, when a new DN is added, all the related data partitions across multiple tables may be moved in a single command obviating user intervention.

Figure 12:
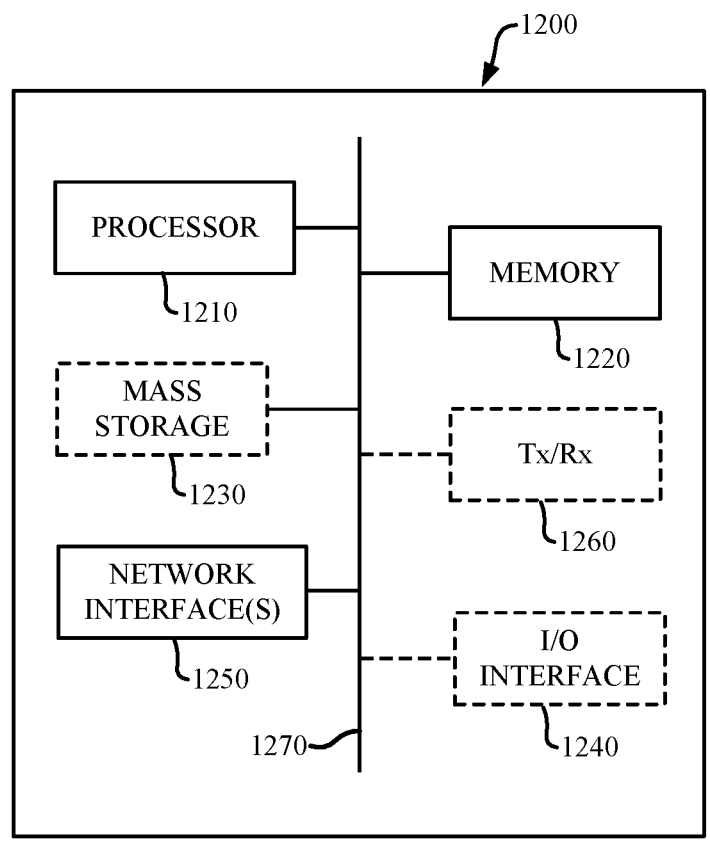
FIG. 12 is an apparatus that may perform any or all of operations of the methods and features explicitly or implicitly described herein, according to an embodiment.

FIG. 12 is an apparatus that may perform any or all of operations of the above methods and features explicitly or implicitly described herein, according to an aspect. In some aspects, the apparatus 1200 may refer to a data parallel architecture, a processing unit, a GPU, and the like as may be appreciated by a person skilled in the art. In some aspects, apparatus 1200 may be used to implement one or more aspects described herein.

As shown, the apparatus 1200 may include a processor 1210, such as a central processing unit (CPU) or specialized processors such as a graphics processing unit (GPU) or other such processor unit, memory 1220, non-transitory mass storage 1230, input-output interface 1240, network interface 1250, and a transceiver 1260, all of which are communicatively coupled via bi-directional bus 1270. According to certain aspects, any or all of the depicted elements may be utilized, or only a subset of the elements. Further, apparatus 1200 may contain multiple instances of certain elements, such as multiple processors, memories, or transceivers. Also, elements of the hardware device may be directly coupled to other elements without the bi-directional bus. Additionally, or alternatively to a processor and memory, other electronics, such as integrated circuits, may be employed for performing the required logical operations.

The memory 1220 may include any type of non-transitory memory such as static random access memory (SRAM), dynamic random access memory (DRAM), synchronous DRAM (SDRAM), read-only memory (ROM), any combination of such, or the like. The mass storage element 1230 may include any type of non-transitory storage device, such as a solid state drive, hard disk drive, a magnetic disk drive, an optical disk drive, USB drive, or any computer program product configured to store data and machine executable program code. According to certain aspects, the memory 1220 or mass storage 1230 may have recorded thereon statements and instructions executable by the processor 1210 for performing any of the aforementioned method operations described above.

One or more aspects of the disclosure may be implemented using electronics hardware, software, or a combination thereof. Some aspects may be implemented by one or multiple computer processors executing program instructions stored in memory. Some aspects may be implemented partially or fully in hardware, for example using one or more field programmable gate arrays (FPGAs) or application specific integrated circuits (ASICs) to rapidly perform processing operations.

It will be appreciated that, although specific aspects of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, smart phone, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

In addition, embodiments of the instant application may be configured as a chip, for example a microchip, computer chip or integrated circuit or similar device, wherein the chip includes a processor and a data interface, and the processor reads, by using the data interface, an instruction stored in a memory, to perform one or more of the methods described herein.

Through the descriptions provided herein, some aspects may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disc read-only memory (CD-ROM), USB flash disk, or a removable hard disk. The software product includes a number of instructions that enable a computer device (personal computer, server, or network device) to execute the methods according to one or more aspects described herein. For example, such an execution may correspond to a simulation of the logical operations as described herein. The software product may additionally or alternatively include a number of instructions that enable a computer device to execute operations for configuring or programming a digital logic apparatus in accordance with one or more aspects described herein.

Although some aspects have been described with reference to specific features and embodiments, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method comprising:
    relocating a first table and a second table of a database to a first node of the database, wherein the first table and the second table are associated with one or more distribution keys corresponding to one or more columns of the first table and the second table;
    defining a colocation relationship between the first table and the second table based on a distribution key of the one or more distribution keys, the colocation relationship indicating that any portion of data of the first table and a portion of data of the second table that correspond according to the distribution key are to reside on a same node of the database;
    generating one or more partitions defining a first set of data of the first table and a second set of data for the second table, and
    dynamically partitioning the one or more partitions during relocation of the first set of data and the second set of data to maintain the colocation relationship, wherein the dynamic partitioning is performed based on the colocation relationship and the distribution key.

2. The method of claim 1 further comprising:
    receiving a request to move the first set of data of the first table from the first node to a second node of the database;
    determining, based on the colocation relationship and the first set of data, the second set of data of the second table corresponding to the first set of the data of the first table; and
    moving the first set of data and the second set of data from the first node to the second node.

3. The method of claim 1, wherein generating the one or more partitions defining the first set of data and the second set of data comprises:
    dividing at least one partition of one or more of: the first table and the second table, to generate the one or more partitions.

4. The method of claim 3, wherein moving the first set of data and the second set of data from the first node to the second node comprises:
    moving the one or more partitions from the first node to the second node.

5. A method comprising:
    creating a first table and a second table for a database;
    defining one or more distribution keys for the first table and the second table based on one or more columns of the first table and the second table;
    defining a colocation relationship between the first table and the second table based on at least one distribution key of the one or more distribution keys, the colocation relationship indicating that any portion of data of the first table and a portion of data of the second table that correspond according to the distribution key are to reside on a same node of the database;
    generating one or more partitions defining a first set of data of the first table and a second set of data for the second table, and
    dynamically partitioning the one or more partitions during relocation of the first set of data and the second set of data to maintain the colocation relationship, wherein the dynamic partitioning is performed based on the colocation relationship and the distribution key.

6. The method of claim 5 further comprising:
    receiving a request to move the first set of data of the first table from a first node of the database to a second node of the database;
    determining, based on the colocation relationship and the first set of data, the second set of data of the second table corresponding to the first set of the data of the first table; and
    moving the first set of data and the second set of data from the first node to the second node.

7. The method of claim 6, wherein generating the one or more partitions defining the first set of data and the second set of data comprises:
dividing at least one partition of one or more of: the first table and the second table, to generate the one or more partitions.

8. The method of claim 7, wherein moving the first set of data and the second set of data from the first node to the second node comprises:
moving the one or more partitions from the first node to the second node.

9. A method comprising:
receiving a request to move data of a first table from a first node of a database to a second node of the database;
determining one or more other tables having a colocation relationship with the first table based on a mutual column or columns;
determining one or more partition boundaries based on the data and the one or more other tables;
generating, based on the one or more partition boundaries, a set of partitions associated with one or more of: the first table and the one or more other tables;
dynamically partitioning the one or more partitions during relocation of the first set of data and the second set of data to maintain the colocation relationship, wherein the dynamic partitioning is performed based on the colocation relationship and the distribution key, and
moving one or more partitions from the set of partitions from the first node to the second node.

10. The method of claim 9 wherein the colocation relationship indicates that any portion of data of the first table and a portion of data of the one or more other tables that correspond according to the mutual column or columns are to reside on a same node of the database.

11. The method of claim 9, wherein generating, based on the one or more partition boundaries, the set of partitions comprises:
dividing at least one partition of one or more of: the first table and the one or more other tables, to generate the one or more partitions, wherein the one or more partitions comprise the data of the first table and data of the one or more other tables that correspond to the data of the first table according to the colocation relationship.

12. The method of claim 9, wherein moving the one or more partitions from the set of partitions from the first node to the second node comprises, for each partition of the one or more partitions:
obtaining, from the first node, data associated with said each partition; and
creating, at the second node, a corresponding partition for the data associated with said each partition.

13. An apparatus comprising:
at least one processor and at least one machine-readable medium storing executable instructions which when executed by the at least one processor cause the apparatus to:
relocate a first table and a second table of a database to a first node of the database, wherein the first table and the second table are associated with one or more distribution keys corresponding to one or more columns of the first table and the second table;
define a colocation relationship between the first table and the second table based on a distribution key of the one or more distribution keys, the colocation relationship indicating that any portion of data of the first table and a portion of data of the second table that correspond according to the distribution key are to reside on a same node of the database;
generating one or more partitions defining a first set of data of the first table and a second set of data for the second table, and
dynamically partitioning the one or more partitions during relocation of the first set of data and the second set of data to maintain the colocation relationship, wherein the dynamic partitioning is performed based on the colocation relationship and the distribution key.

14. The apparatus of claim 13, further configured to:
receive a request to move the first set of data of the first table from the first node to a second node of the database;
determine, based on the colocation relationship and the first set of data, the second set of data of the second table corresponding to the first set of the data of the first table; and
move the first set of data and the second set of data from the first node to the second node.

15. The apparatus of claim 14, wherein generating the one or more partitions defining the first set of data and the second set of data comprises:
dividing at least one partition of one or more of: the first table and the second table, to generate the one or more partitions.

16. The method of claim 1, further comprising:
sending a notification indicating generation of the one or more partitions, the notification including information indicative of a range of values corresponding to the generated one or more partitions.

17. The method of claim 1, wherein before relocating the first table and the second table, said any portion of data of the first table and the portion of data of the second table that correspond according to the distribution key reside in different nodes of the database.

18. The method of claim 9, further comprising:
performing a two-phase commit protocol to commit a transaction for movement of the one or more partitions, wherein the two-phase commit protocol comprises a commit-request phase and a commit phase.

19. The method of claim 9, further comprising performing a two-phase commit protocol, wherein the two-phase commit protocol comprises:
a commit-request phase in which a coordinator process attempts to prepare all participating processes of a transaction to take necessary actions; and
a commit phase in which whether the transaction is to be committed or aborted is determined.

20. The method of claim 9, further comprising:
sending a notification indicating generation of the one or more partitions, the notification including information indicative of a range of values corresponding to the generated one or more partitions;
determining one or more partitions to be moved based on at least one or more of: the notification, the determined partition boundaries, and the one or more colocation relationships; and
updating, based on the notification, a catalog table associated with the database to reflect movement of the first set of data and the second set of data from the first node to the second node.

* * * * *